(12) United States Patent
Childers

(10) Patent No.: US 11,325,314 B2
(45) Date of Patent: May 10, 2022

(54) THREE-DIMENSIONAL ARTICLE MANUFACTURING SYSTEM WITH BUILD PLAN OPTIMIZATION FOR HIGH RISK ARTICLE DESIGN

(71) Applicant: 3D Systems, Inc., Rock Hill, SC (US)

(72) Inventor: Winthrop Childers, San Diego, CA (US)

(73) Assignee: 3D Systems, Inc., Rock Hill, SC (US)

( * ) Notice: Subject to any disclaimer, the term of this patent is extended or adjusted under 35 U.S.C. 154(b) by 348 days.

(21) Appl. No.: 16/718,970

(22) Filed: Dec. 18, 2019

(65) Prior Publication Data

US 2020/0198248 A1 Jun. 25, 2020

Related U.S. Application Data

(60) Provisional application No. 62/781,979, filed on Dec. 19, 2018.

(51) Int. Cl.

| | |
|---|---|
| *B29C 64/393* | (2017.01) |
| *B29C 64/135* | (2017.01) |
| *B33Y 50/02* | (2015.01) |
| *B33Y 70/00* | (2020.01) |
| *G05B 19/4099* | (2006.01) |
| *B33Y 30/00* | (2015.01) |

(52) U.S. Cl.
CPC .......... *B29C 64/393* (2017.08); *B29C 64/135* (2017.08); *B33Y 30/00* (2014.12); *B33Y 50/02* (2014.12); *B33Y 70/00* (2014.12); *G05B 19/4099* (2013.01); *G05B 2219/49007* (2013.01); *G05B 2219/49008* (2013.01)

(58) Field of Classification Search
CPC ........ B29C 64/393; B33Y 30/00; B33Y 50/02
USPC ......................................................... 700/98
See application file for complete search history.

(56) References Cited

U.S. PATENT DOCUMENTS

| | | | | |
|---|---|---|---|---|
| 2014/0086780 A1* | 3/2014 | Miller | ................. | A61F 2/30942 419/1 |
| 2015/0220748 A1* | 8/2015 | Leach | ..................... | G06F 21/10 726/26 |
| 2015/0370958 A1* | 12/2015 | Arisoy | .................... | G06F 30/17 700/98 |
| 2019/0152144 A1* | 5/2019 | Munro | ................... | B33Y 30/00 |
| 2020/0133235 A1* | 4/2020 | El-Tahry | ................ | A23P 20/20 |
| 2021/0276270 A1* | 9/2021 | Luan | ..................... | B33Y 10/00 |

* cited by examiner

*Primary Examiner* — Robert A Cassity

(57) ABSTRACT

A three-dimensional printing system includes a print engine, a storage subsystem, and a controller. The print engine includes a resin vessel having a lower side with a transparent sheet, a light engine that defines a build field above the transparent sheet, and a motorized carriage for holding a support tray with a lower surface above the resin vessel. The storage subsystem is configured to store support trays. The controller is configured to: receive a build order including a plurality of incoming files individually defining a three-dimensional article to be fabricated, process and determine breakage-related risk factors for the processed files, define a build plan for at least some of the plurality of processed files based at least partly upon the determined risk factors, and operate the print engine and the storage subsystem to build and store three-dimensional articles according to the defined build plan.

18 Claims, 6 Drawing Sheets

THREE-DIMENSIONAL ARTICLE MANUFACTURING SYSTEM WITH BUILD PLAN OPTIMIZATION FOR HIGH RISK ARTICLE DESIGN

CROSS-REFERENCE TO RELATED APPLICATIONS

This non-provisional patent application claims priority to U.S. Provisional Application Ser. No. 62/781,979, Entitled "Three-Dimensional Article Manufacturing System with Build Plan Optimization for High Risk Article Design" by Winthrop Childers, filed on Dec. 19, 2018, incorporated herein by reference under the benefit of U.S.C. 119(e).

FIELD OF THE INVENTION

The present disclosure concerns a three-dimensional printing system for manufacturing a plurality of three-dimensional articles. More particularly, the present disclosure is for preventing severe damage to the system during an unattended manufacturing queue.

BACKGROUND

Three-dimensional (3D) printing systems are in rapidly increasing use. One class of 3D printing systems includes stereolithography systems having a general principle of operation including the selective curing and hardening of radiation curable (photocurable) liquid resins. A typical stereolithography system includes a resin vessel holding the photocurable resin, a movement mechanism coupled to a support surface, and a controllable light engine. The stereolithography system forms a three-dimensional (3D) article of manufacture by selectively curing layers of the photocurable resin. Each selectively cured layer is formed at a "build field" within the resin.

There is a desire to provide a stereolithography-based system that can operate unattended to build a queue of 3D articles. Some of the 3D articles can have geometric designs that are challenging to manufacture. One particular problem is breakage in which an article breaks during manufacture and leaves fragments behind in the resin vessel. If another article is to be fabricated in an the unattended queue, the fragments can interfere with the subsequent operation and even cause severe damage to the system.

SUMMARY

Figure 1:
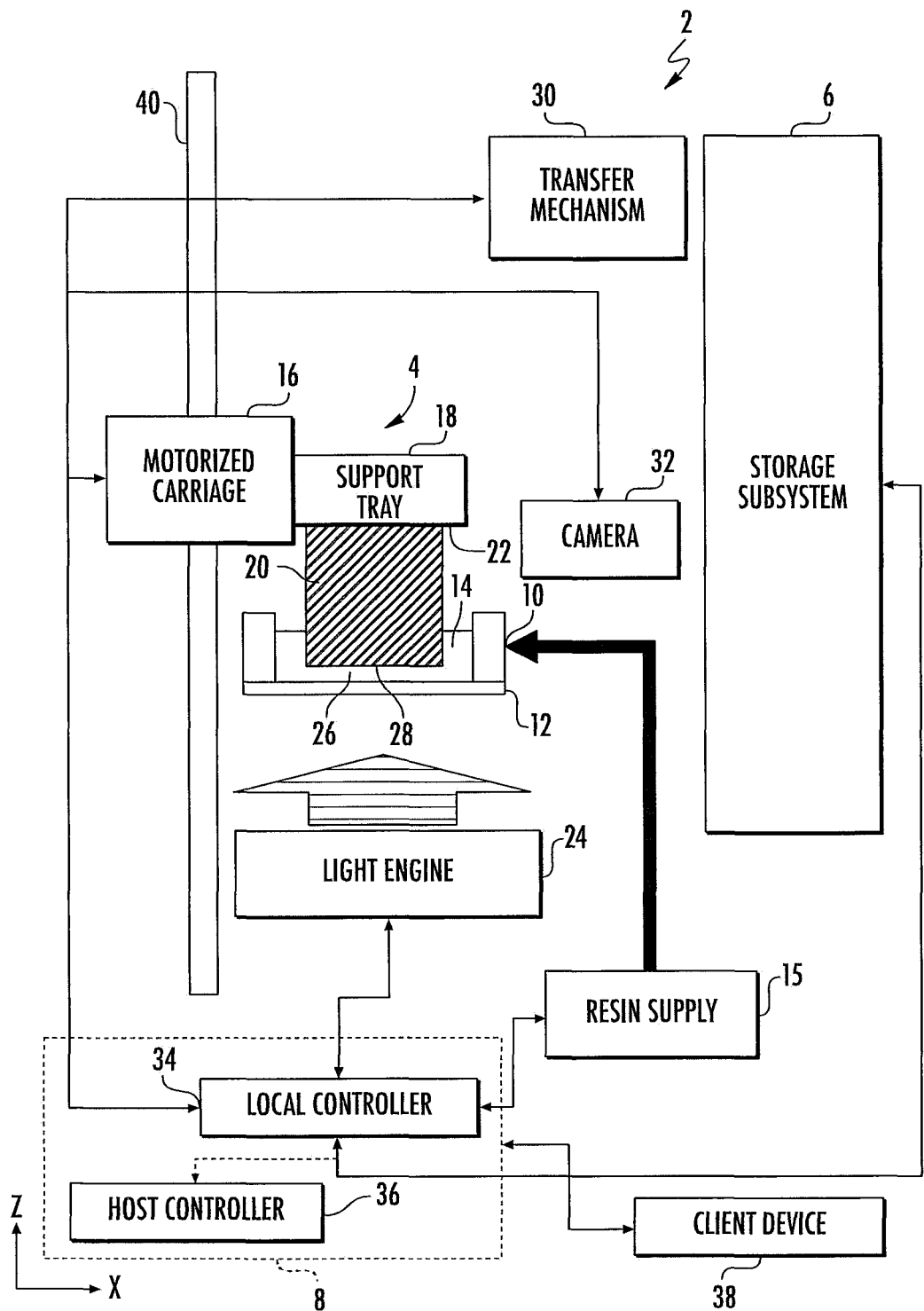
FIG. 1 is a block diagram schematic of an embodiment of a three-dimensional printing system for manufacturing and storing a plurality of three-dimensional articles.

In an aspect of the invention, a three-dimensional printing system is configured to manufacture a plurality of three-dimensional articles according to a build plan having a build queue. The three-dimensional printing system includes a print engine, a storage subsystem, and a controller. The print engine includes a resin vessel having a lower side with a transparent sheet, a light engine that defines a build field above the transparent sheet, and a motorized carriage for holding a support tray with a lower surface above the resin vessel. The storage subsystem is configured to store support trays. The controller is configured to: receive a build order including a plurality of incoming files individually defining a three-dimensional article to be fabricated, process and determine breakage-related risk factors for the processed files, define the build plan for at least some of the plurality of processed files based at least partly upon the determined risk factors, and operate the print engine and the storage subsystem to build and store three-dimensional articles according to the defined build plan.

The "breakage-related risk" factor concerns the likelihood that a portion of the three-dimensional article will separate during fabrication and fall down into the resin vessel. This can cause severe or catastrophic damage if, during a process of building a subsequent three-dimensional article, the separated portion is compressed between a lower face of a support tray and the transparent sheet. This can cause damage or puncture of the transparent sheet.

In one implementation the controller includes a host computer and a local controller. The host controller is configured to process and analyze the build files and to generate a package for a processed file. The package includes the processed build file that is "printer-ready", a risk factor for the processed file, and further instructions as needed. By "printer-ready", the file has been "sliced" and otherwise processed so that it can be utilized by the local controller. The local controller receives the packages and then defines the build plan including a queue. The local controller also operates the print engine and storage subsystem to build and store the three-dimensional articles according to the build plan.

In another implementation, the controller is one integrated unit. The integrated unit receives the incoming files and generates packages for the build files. A package includes a sliced build file and a risk factor. The integrated unit defines the build plan and operates the print engine and storage subsystem to execute the build plan.

In yet another implementation, the controller analyzes the geometry of a processed file and determines a risk factor based upon a geometric factor of the processed file. The geometric factor can include one or more of a minimum lateral dimension, a minimum lateral cross-sectional area, a vertical length to lateral width ratio, a narrow beam supporting a hanging object, and beams having narrowed and weak sections that increase a chance of the "breakage-related risk."

In a further implementation, the controller is further configured to transmit an alert to a client device when one or more of the risk factors exceed a certain threshold. A user can have an option of removing a package from the queue having the elevated risk factor using the client device.

In a yet further implementation, defining the build plan includes modifying the queue as a function of the risk factors. The processed files can be temporally ordered according to an increasing risk factor. A processed file with an elevated risk can be placed at the end of the queue. Processed files with risk factors exceeding a certain threshold can be removed from the queue.

In another implementation, defining the build plan can include instructions for a camera to capture an image of articles having a high risk factor. In particular, an image of a high risk portion (one more likely to break off and fall into the resin vessel) can be captured. After fabrication of the article, the image can be analyzed to verify whether the high risk portion is present. If presence of the high risk portion cannot be verified, further operation of the three-dimensional printing system can be halted. An alert can be sent from the controller to a client device to inform a user of the aborted operation.

DETAILED DESCRIPTION OF THE PREFERRED EMBODIMENTS

FIG. 1 is a block diagram schematic representation of an embodiment of a three-dimensional printing system 2 for manufacturing and storing a plurality of three-dimensional articles. In describing system 2, mutually orthogonal axes X, Y, and Z may be used. Axes X and Y are lateral axes that are generally horizontal. Axis Z is a vertical axis that is generally aligned with a gravitational reference. Generally aligned means aligned by design but to within normal manufacturing tolerances and affected by where the system 2 is physically located.

System 2 includes a print engine 4 and a storage subsystem 6 under control of a controller 8. The print engine 4 includes a resin vessel 10 having a lower side with a transparent sheet 12. The transparent sheet 12 defines a lower bound for the photocurable resin 14 contained in the resin vessel 10. A resin supply 15 is configured to provide resin to replenish the resin vessel 10.

A motorized carriage 16 supports and vertically positions a support tray 18. A three-dimensional article 20 is formed onto a lower surface 22 of the support tray 18. Positioned below the resin vessel 10 is a light engine 24. Light engine 24 is configured to project pixelated light up to a build field 26 which is proximate to a lower face of the three-dimensional article 20. The build field 26 defines a lateral extent that the light engine can address in the photocurable resin 14.

Storage subsystem 6 is configured to provide empty support trays 18 to the motorized carriage 16 and to receive full support trays 18. A full support tray 18 is defined as a support tray 18 with a three-dimensional article 20 attached to the lower surface 22. A transfer mechanism 30 is configured to transfer support trays 18 between the print engine 4 and the storage subsystem 6. In some embodiments, the storage subsystem includes two separate storage subsystems—one for empty support trays 18 and one for full support trays 18. In other embodiments, the storage subsystem stores full and empty support trays 18 in the same physical storage unit.

A camera 32 is configured to capture images of the three-dimensional article 20 after it is formed. Camera 32 can include multiple cameras that capture multiple images of the three-dimensional article 20 from different directions and/or at different magnifications.

In the illustrated embodiment, the controller 8 includes a local controller 34 and a host computer 36. The local controller 34 is coupled to the storage subsystem 6, the resin supply 15, the motorized carriage 16, the light engine 24, the transfer mechanism 30, and the camera 32. The host computer 36 is coupled to the local controller 34. In some alternative embodiments, the local controller 34 and the host computer 36 are integrated into one unit which can be referred to as controller 8.

The controller 8 includes a processor and an information storage device (at least one of each). The information storage device includes a non-volatile or non-transient storage device that stores software instructions. When executed by the processor, the software instructions control the storage subsystem 6, the resin supply 15, the motorized carriage 16, the light engine 24, the transfer mechanism 30, and the camera 32. The software instructions also process incoming data that defines a plurality of three-dimensional articles 20.

A client device 38 can be coupled to the controller 8 via the Internet or other network. The client device 38 can include one or more of a smartphone, a laptop computer, a desktop computer, a tablet computer, or other portable computing device. The client device 38 is operated by a user to control and monitor system 2. In some embodiments, the controller 8 can also include a server (not shown).

In an illustrative embodiment, the controller 8 can manufacture a single three-dimensional article 20 with the following steps: (1) Operate transfer mechanism 30 to transfer an empty support tray 18 from the storage subsystem 6 to the motorized carriage 16. (2) Operate the motorized carriage 16 to position the lower face 22 at the build field 26. (3) Operate the light engine 24 to selectively harden one or more layers of the resin 14 onto the lower face 22. After step (3), the three-dimensional article 20 is partially formed with lower face 28. (4) Operate the motorized carriage 16 to reposition the lower face 28 at the build field 26. (5) Operate the light engine to selectively harden one or more layers onto the lower face 28. (6) Repeat steps (4) and (5) to complete fabrication of the three-dimensional article 20. (7) Operate the motorized carriage 16 to position the three-dimensional article 20 within a vertical range of one or more cameras 32. (8) Operate cameras 32 to capture one or more images of the three-dimensional article 20. (9) Analyze the captured images to verify whether the three-dimensional article 20 is fully present on the support tray 18. (10) Operate the motorized carriage 16 and the transfer mechanism 30 to transfer the now-full support tray 18 to the storage subsystem 6. (11) Based upon the analysis of step (9), determine whether another three-dimensional article 20 can be fabricated.

The controller 8 is configured to operate the print engine 4 and storage subsystem to build a plurality of three-dimensional articles 20 in sequence. One aspect of the current disclosure is a risk of breakage of the three-dimensional article 20 during manufacture. If a portion of the three-dimensional article 20 separates during manufacture it will then fall into the resin vessel 10. During the manufacture of a subsequent three-dimensional article 20, the broken-off portion may be sandwiched between the lower face 22 of support tray 18 and the transparent sheet 12. This could result in damage to the subsequent three-dimensional article 20 or even a rupture or severe damage to the transparent sheet 12. The present disclosure greatly reduces a likelihood of such an event during the manufacture of multiple three-dimensional articles 20.

Figure 2:
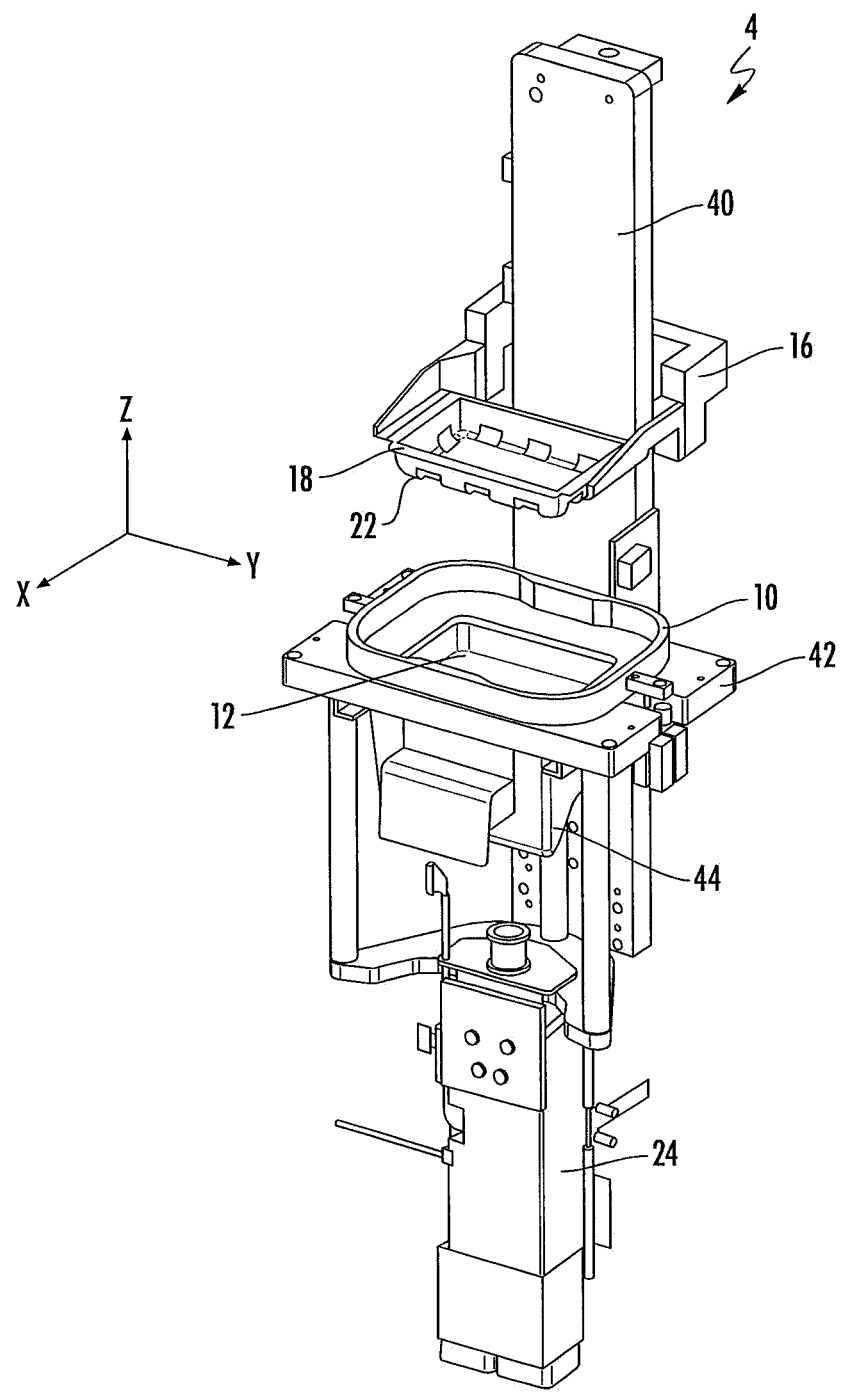
FIG. 2 is an isometric drawing of an embodiment of a print engine.

FIG. 2 is an isometric drawing of an embodiment of the print engine 4. A main vertical support 40 supports a support plate 42. Support plate 42 is for supporting the resin vessel 10 and the light engine 24. The motorized carriage 16 is configured to move vertically along the main vertical support 40. In the illustrative embodiment, a motor and lead screw (not shown in this view) provide the vertical motion for motorized carriage 16.

The support plate 42 supports a spill containment vessel 44 for capturing resin in the event that the resin vessel 10 is overfilled or the transparent sheet 12 is ruptured during manufacture. During unattended operation, the resin supply 15 may continue to pump resin to the resin vessel 10 if the transparent sheet 12 is ruptured. There is then even a risk that even the spill containment vessel 44 is overfilled and then resin could spill onto the light engine 24 optics. Even if the spill containment vessel 44 has sufficient capacity, the transparent sheet 12 can be a very costly component depending on materials used.

Figure 3A:
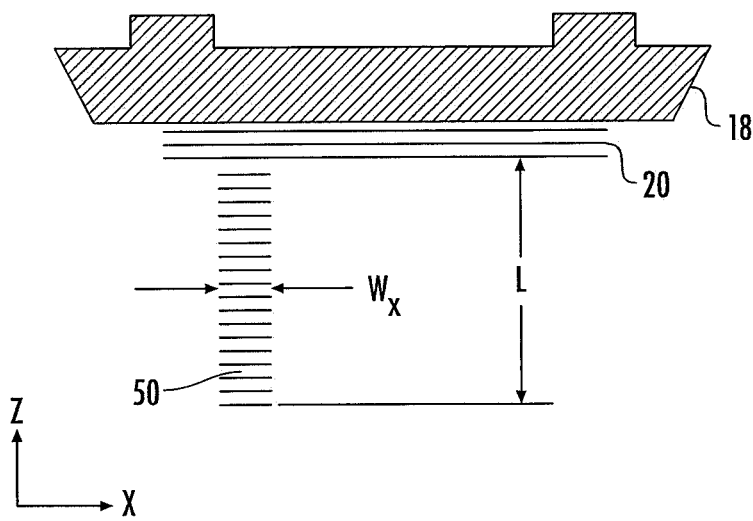
FIG. 3A depicts a first embodiment of a three-dimensional article attached to a support tray. The three-dimensional article includes a beam-shaped portion with an elevated risk of breakage during fabrication.
Figure 3B:
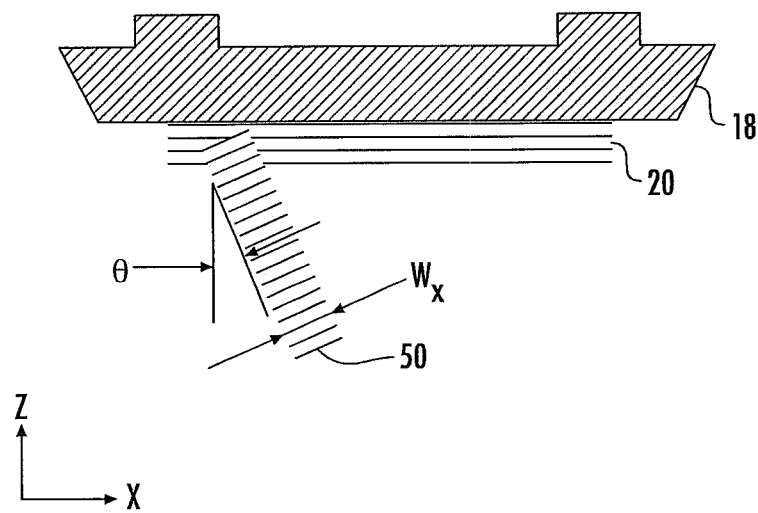
FIG. 3B depicts a second embodiment of a three-dimensional article attached to a support tray. The three-dimensional article includes an obliquely extending beam-shaped portion with an elevated risk of breakage during fabrication.

FIGS. 3A-3B depict examples of geometries of three-dimensional articles 20 that may have elevated risk factor for breakage during manufacture. A portion 50 of the three-dimensional article 20 may separate and fall into the resin vessel 10 during the manufacture of a subsequent three-dimensional article 20. A "risk factor" is defined as directly or generally increasing with an increasing likelihood of such breakage.

FIG. 3A depicts a first three-dimensional article 20 with a beam-shaped portion 50 providing an elevated risk of breakage. In the illustrated embodiment, the portion 50 has a downward extending length L and a width along the X axis W. As $W_x$ decreases, and L increases, the risk factor increases. Also, a decreased lateral cross sectional area $W_x W_y$ increases a risk of breakage in which $W_y$ is a lateral width along the Y axis.

FIG. 3B depicts a second three-dimensional article 20 with a portion 50 providing an elevated risk of breakage. This is similar to the first embodiment except that the beam-shaped portion extends downwardly with an oblique angle of θ relative to a vertical direction. A risk factor varies with width W, length, and cross-sectional area much like that of the embodiment of FIG. 3A. Other geometries may have curvature, a "zig-zag" geometry or other geometries but length, cross-sectional area, and lateral dimensional parameters can still be computed to ascertain a risk factor.

Figure 3C:
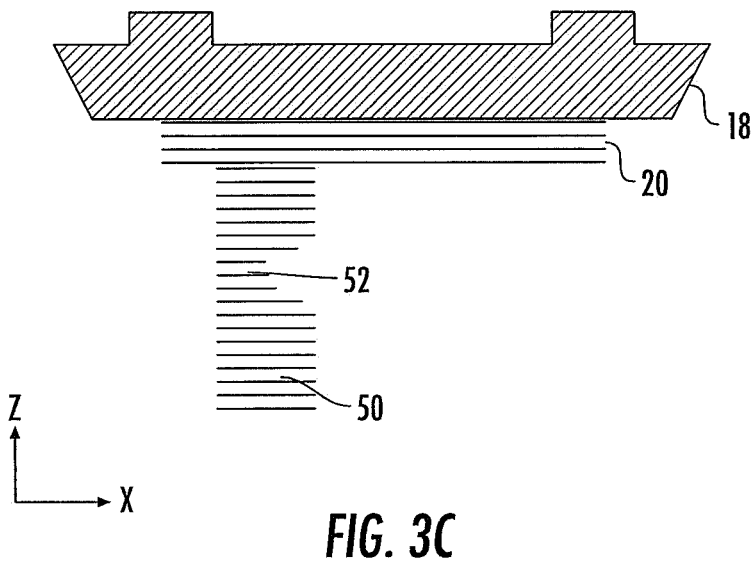
FIG. 3C depicts a third embodiment of a three-dimensional article attached to a support tray. The three-dimensional article includes a beam-shaped portion having a weak section with an elevated risk of breakage during fabrication.

FIG. 3C depicts a third three-dimensional article 20 with a portion 50 providing an elevated risk of breakage. In the illustrated embodiment, the risk factor is a notch or divot 52 which would result in a weak section of portion 50. The risk factor can positively correlate with a depth of the notch in relation to a lateral width W of the portion 50 as well as a minimum lateral dimension or cross-sectional area at the notch. Depending upon geometry, a notch 52 can be a source of a crack initiation in the material of article 20.

Figure 3D:
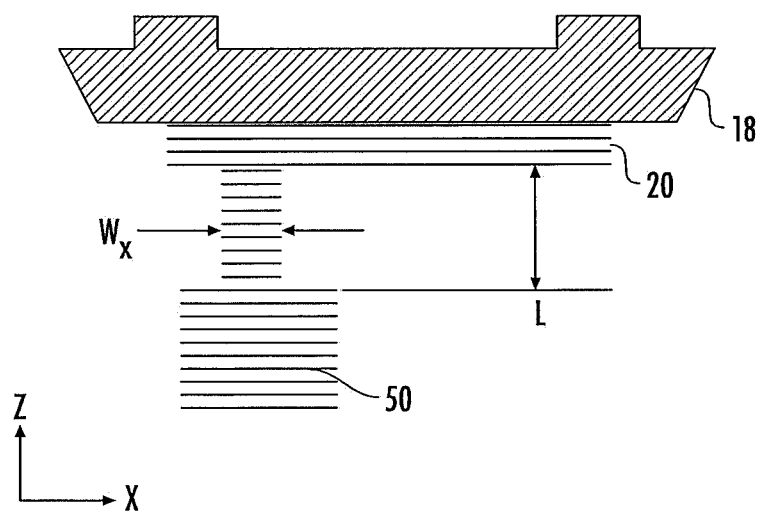
FIG. 3D depicts a fourth embodiment of a three-dimensional article attached to a support tray. The three-dimensional article includes a beam-shaped portion supporting a "pendant" with an elevated risk of breakage during fabrication.

FIG. 3D depicts a fourth three-dimensional article 20 with a portion 50 providing an elevated risk of breakage. In the illustrated embodiment, the portion 50 includes a narrow beam of lateral width $W_x$ and length L supporting a laterally broader "pendant" portion. Compared to the embodiment of FIG. 3A, the supported pendant further increases the risk factor of breakage.

The result of any or all features such as those depicted in FIGS. 3A-D is an increase in a "risk factor" which is indicative of a likelihood that a portion 50 of the article 40 will break off during manufacturing and fall into the resin vessel 10. In addition to the geometries of specific features other factors contribute to the breakage risk and risk factor. These include: (1) The number of elevated risk portions 50. (2) Material properties such as a maximum elongation before breakage. (3) The cure profile. A greater degree of cure may improve the modulus but also make the material more brittle. (4) Motion up and down of the support tray 18 during manufacture.

Figure 4:
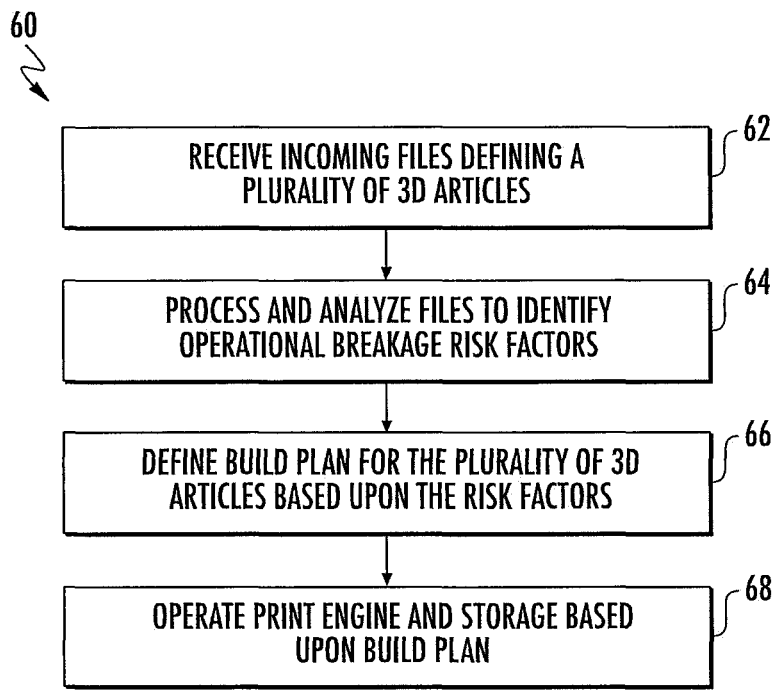
FIG. 4 is a flowchart depicting an embodiment of a method for manufacturing three-dimensional articles.

FIG. 4 is a flowchart depicting an embodiment of a method 60 for manufacturing a plurality of three-dimensional articles 20 to minimize and/or mitigate breakage. Method 60 is performed by controller 8.

According to 62, a plurality of incoming files are received that define the plurality of articles 20. According to 64, the incoming files are processed and analyzed to individually determine risk factors for the processed files. A risk factor is indicative of an estimated probability that a breakage will occur during fabrication. In an illustrative embodiment, a geometry of the processed file is analyzed to determine the risk factor. The risk factor is based upon a geometric factor of the processed file. Examples of such geometric factors were previously discussed with respect to FIGS. 3A-D.

According to 66, a build plan is defined that is at least partly based upon the risk factors. The build plan includes a queue for temporally ordering the articles 20 to be manufactured. The build plan may also include instructions for operating the camera 32 and for analyzing resultant captured images. According to 68, the printing system 2 is operated consistent with the build plan to build and store the plurality of articles 20.

Figure 5:
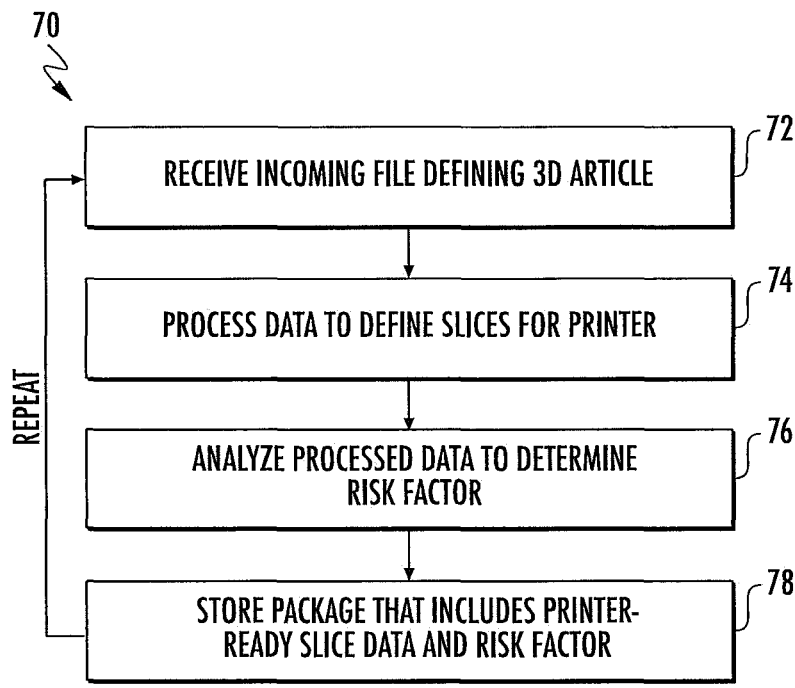
FIG. 5 is a flowchart depicting an embodiment of a method for processing an incoming file defining a three-dimensional article. The processing results in a print-ready file and a risk factor for the file.

FIG. 5 is a flowchart depicting an embodiment of a method 70 performed by a host computer 36 on an incoming file defining a three-dimensional article 20. This method prepares a package for the article 20, with the package containing a processed file and an associated risk factor. According to 72, an incoming file is received that defines a three-dimensional article. According to 74, the file is processed to define slices of the article. The processed file is in a form that can be directly utilized by the local controller 34 for controlling the print engine 4. According to 76, the processed (sliced) data is analyzed to determine a risk factor of breakage. According to 78, a package is stored that includes the processed file and the risk factor. For building a plurality of N articles 20, the method 70 can be performed N times to store N packages.

Figure 6:
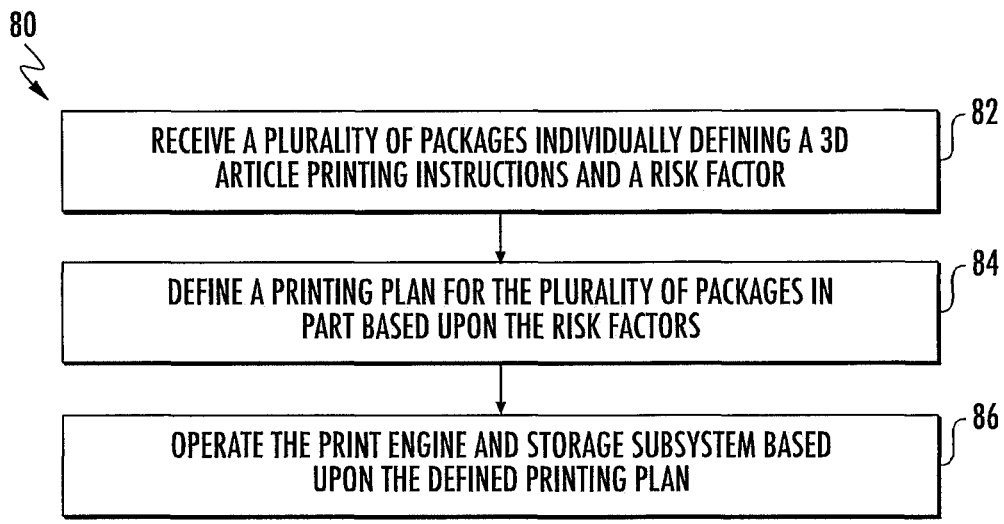
FIG. 6 is a flowchart depicting an embodiment of a method for manufacturing a plurality of three-dimensional articles based upon a plurality of incoming packages. An incoming package includes a print-ready file and a risk factor.

FIG. 6 is a flowchart depicting a method 80 performed by the local controller 34 using the packages from method 70. According to 82, a plurality of packages are received that individually include a print-ready file for a three-dimensional article 20 and a risk factor. A "package" according to methods 70, 80, and 90 is a set of files including a file defining a 3D article to be printed and a file defining a risk factor.

According to 84, a build plan for the plurality of packages is defined at least partly based upon the risk factors. The build plan can include one or more of the following: (1) An alert can be issued to a client device 38 if a risk factor exceeds a threshold. The alert can require that a user approve printing an article 20 with a higher risk of breakage. (2) A temporal queue for the packages can order the packages with an increasing risk factor. That way, the probability of a catastrophic failure is minimized. (3) One or more packages can be removed from the queue which have risk factors exceeding a predefined threshold. (4) A package with an elevated risk factor can be placed at the end of the queue. (5) For packages with risk factors above a certain threshold, the plan can include capturing an image of a high risk portion 50 of the article 20. According to 86, the print engine 4 and the storage subsystem 6 are operated to fabricate and store articles 20 according to the build plan defined in step 84.

In an alternative embodiment, the host computer can define the build plan according to step 84. Then the local computer only performs step 86 according to the build plan.

Figure 7:
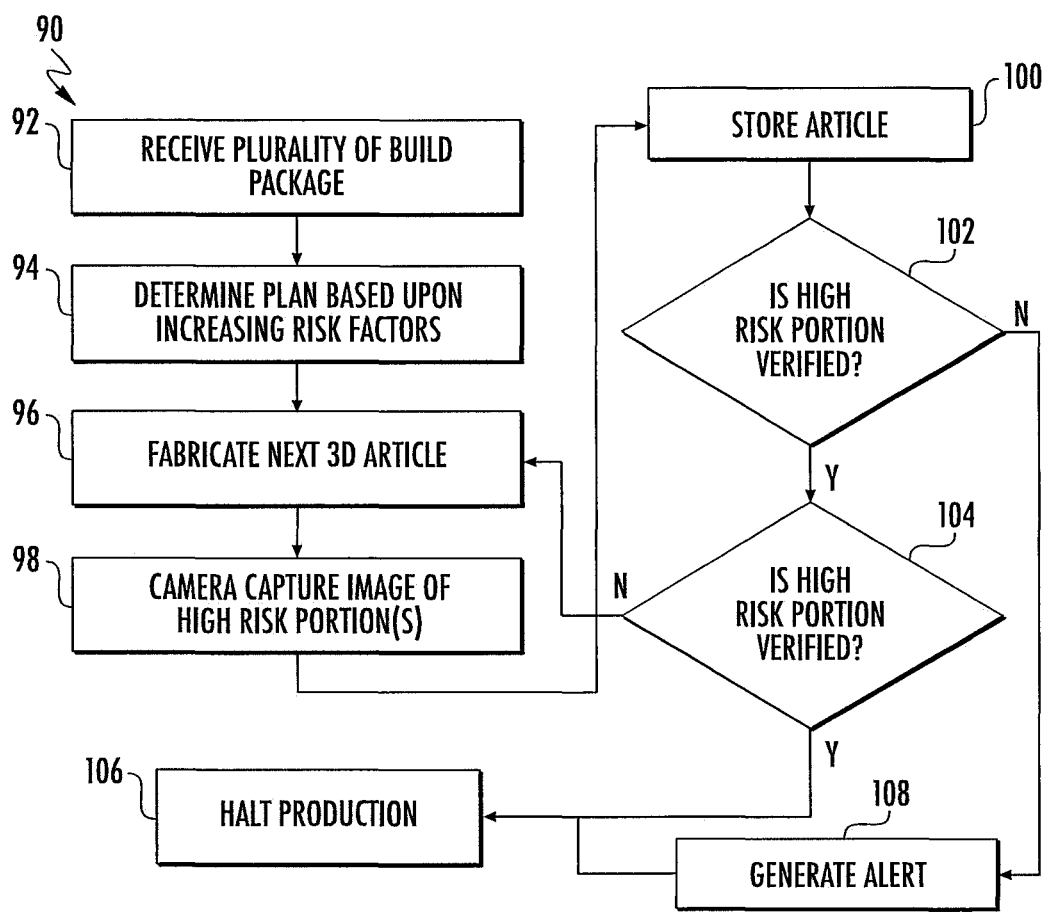
FIG. 7 is a flowchart depicting an embodiment of a method for manufacturing a plurality of three-dimensional articles based upon a plurality of incoming packages. The method of FIG. 7 includes defining a build plan at least partly based upon the risk factors. The risk factors are used to determine the order of a print queue and in camera-based image capture and analysis.

As indicated by the numbered alternatives above, there are a number of ways of mitigating the breakage risk. Broadly speaking these include modifying the queue and/or camera-based image capture and analysis. FIG. 7 is a flowchart depicting a method 90 that essentially utilizes both of these techniques. Method 90 is performed by local controller 34 (which is part or all of controller 8).

According to 92, a plurality of build packages are received that individually include instructions for printing an article 20 and a risk factor associated with the article geometry. According to 94, a build plan is defined which includes placing one or more higher risk factor packages to an end of a print queue. Step 94 can include other queue optimizations to reduce overall risk, such as ordering the packages according to a temporally increasing risk factor.

According to 96, the print engine 4 is operated to fabricate a three-dimensional article 20 at the start of the queue of the build plan. According to 98, the camera 32 is operated to capture images of any higher risk portions 50 of the article 20. According to 100, the transfer mechanism 30 is used to transfer the article 20 to the storage subsystem 6.

According to 102, the captured images are analyzed to verify that any high risk portion 50 of the article 20 is present in a captured image. If the portion 50 is verified, then a determination is made as to whether the build plan is complete according to 104. If the build plan is not complete, the process returns to 96 to fabricate the next article. Assuming that the build plan is not yet complete and there are no unverified portions 50 of articles 20, the cycle of steps 96, 98, 100, 102, and 104 are repeated. When a build plan is complete is complete then the process moves from step 104 to 106 at which point operation is halted.

If at step 102, the high risk portion 50 is not verified then it is possible that breakage has occurred and a portion or all of the high risk portion 50 has fallen into the resin vessel 10. Then according to 108 the controller 8 sends an alert to client device(s) 38 to inform users that the printing system 2 has malfunctioned and is in need of maintenance. After sending the alert, production is halted according to 106.

The specific embodiments and applications thereof described above are for illustrative purposes only and do not preclude modifications and variations encompassed by the scope of the following claims.

What is claimed:

1. A three-dimensional printing system for manufacturing three-dimensional articles, the three dimensional printing system comprising a print engine configured to photopolymerize a plurality of layers onto a lower surface of a support tray, a storage subsystem configured to store the support trays, and a controller comprising a processor coupled to a non-volatile memory system, the non-volatile memory storing software instructions, in response to execution by the processor the software instructions cause the controller operate the three-dimensional printing system to:

receive a build order including a plurality of incoming files individually defining a three-dimensional article to be fabricated;

process and determine breakage-related risk factors for the incoming files;

define a build plan including a build queue for at least some of the plurality of build files based at least partly upon the determined risk factors, defining the build plan includes placing a higher risk factor file at the end of the build queue; and operate the print engine and the storage subsystem to build and store three-dimensional articles according to the build sequence of the build plan.

2. The three-dimensional printing system of claim 1 wherein the controller includes a host computer and a local controller, the host computer includes a host processor coupled to non-transient host memory storing software instructions that in response to execution by the host processor process and analyze the build files and individually generate and store a risk factor for a build file.

3. The three-dimensional printing system of claim 1 wherein the controller analyzes a geometry of a processed file and determines a risk factor based upon a geometric factor of the processed file.

4. The three-dimensional printing system of claim 3 wherein the geometric factor includes one or more of a minimum lateral dimension, a minimum lateral cross-sectional area, a vertical length to lateral width ratio, a narrow beam supporting a hanging object, and beams having narrowed and weak sections that increase a chance of the breakage.

5. The three-dimensional printing system of claim 1 wherein the controller is further configured to transmit an alert to a client device when one or more of the risk factors exceed a certain threshold.

6. The three-dimensional printing system of claim 1 wherein the build queue temporally orders the processed files according to an increasing risk factor with time.

7. The three-dimensional printing system of claim 1 wherein defining the build plan include eliminating one or more processed files from the queue for which the risk factors exceed a threshold.

8. The three-dimensional printing system of claim 1 wherein defining the build plan includes capturing an image of a high risk portion of an article after fabrication.

9. The three-dimensional printing system of claim 8 wherein the image is analyzed to verify whether the high risk portion is present and, if the high risk portion is not verified, halting further operation of the three-dimensional printing system.

10. The three-dimensional printing system of claim 9 wherein if the high risk portion is not verified, sending an alert to a client device.

11. A method of manufacturing a plurality of three-dimensional articles individually fabricated by a three-dimensional printing system including a print engine photopolymerizing a plurality of layers onto a lower surface of a support tray and a storage subsystem configured to store a plurality of support trays, the method comprising:

receiving a plurality of incoming files defining the three-dimensional articles;

processing and determining risk factors for the processed files;

determining a build plan including a build queue for at least some of the processed files based at least partly upon the determined risk factors, determining the build plan includes placing a higher risk factor build file at the end of the queue; and operate the print engine and the storage subsystem to build and store the three-dimensional articles according to the optimized build plan.

12. The method of claim 11 wherein a risk factor for a build file is determined based upon a geometric factor of a geometry defined by a build file.

13. The method of claim 12 wherein the geometric factor includes one or more of a minimum lateral dimension, a minimum lateral cross-sectional area, a vertical length to lateral width ratio, a narrow beam supporting a hanging object, and beams having narrowed and weak sections that increase a chance of breakage.

14. The method of claim 11 further comprising sending an alert to a client device if one or more risk factors exceed a threshold.

15. The method of claim 11 wherein defining the build plan includes temporally ordering the processed files according to an increasing risk factor with time.

16. The method of claim 11 wherein determining the build plan includes eliminating a plurality of processed files from the queue for which the risk factor individually exceeds a threshold.

17. The method of claim 11 wherein determining the build plan includes capturing an image of a portion of an article after fabrication.

18. The method of claim 17 wherein the image is analyzed to verify whether the portion of the article is present and, if the portion is not verified to be present, halting further operation of the three-dimensional printing system.

* * * * *